Nov. 15, 1949 S. E. M. STANDAL 2,488,343
CHAIN SAW
Filed July 30, 1945 2 Sheets-Sheet 1

Inventor
Stanley E. M. Standal
By
Glenn L. Fish
Attorney

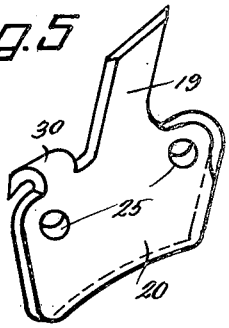
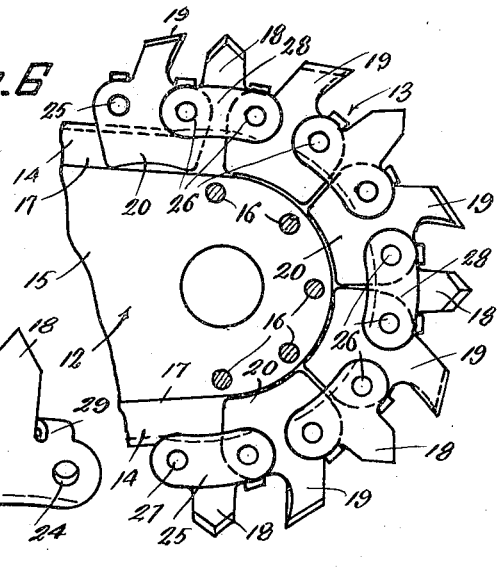
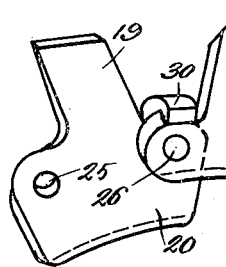
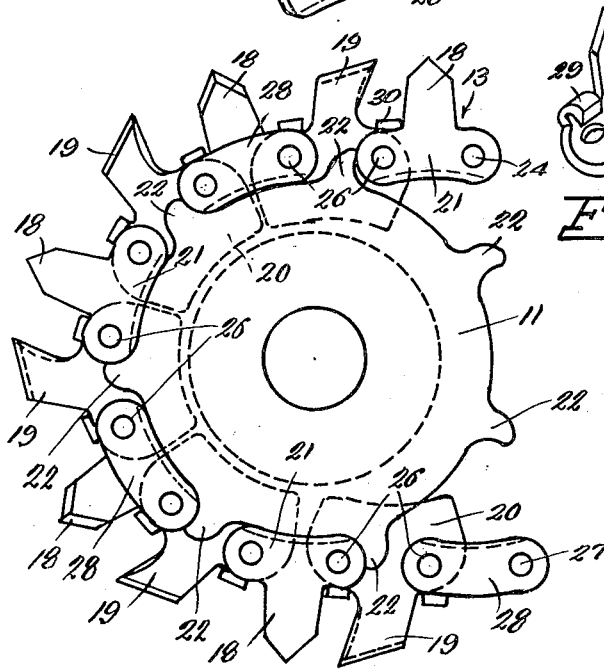
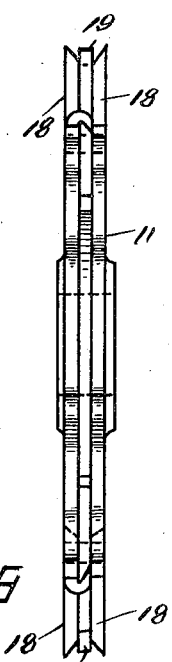

Patented Nov. 15, 1949

2,488,343

UNITED STATES PATENT OFFICE 2,488,343

CHAIN SAW

Stanley E. M. Standal, Spokane, Wash.

Application July 30, 1945, Serial No. 607,759

1 Claim. (Cl. 143—32)

This invention relates to saws and more particularly to a motor driven saw, it being one object of the invention to provide a saw including a chain of pivotally connected cutting teeth and raker teeth trained about sprockets at ends of a bar which projects forwardly from a motor, the motor being equipped with handles by means of which it may be held while the saw is in use.

Another object of the invention is to provide a power saw having a bar projecting forwardly from a motor and of such formation that a chain or saw teeth will be held in engagement with edge faces of the bar and prevented from shifting transversely out of engagement with the bar.

Another object of the invention is to provide the saw with a chain of teeth so formed that they may be pivotally connected with each other, the teeth being provided with transversely extending tongues which engage across adjoining teeth and serve to prevent the teeth from shifting transversely of each other.

Another object of the invention is to provide a power saw which is hand operated and may be used for cutting standing trees or for cutting trunks of fallen trees into logs and for cutting off limbs.

Another object of the invention is to provide a saw which is simple in construction, inexpensive to manufacture, and easy to operate.

The invention is illustrated in the accompanying drawings wherein:

Fig. 5 is a perspective view of a raker tooth.

Fig. 6 is a side elevation of the front end portion of the bar having the chain of teeth about it, a side plate of the bar being removed.

Fig. 7 is a perspective view of a raker tooth and a cutting tooth.

Fig. 8 is a perspective view of a cutting tooth.

Fig. 9 is an edge view of a sprocket at the rear end of the bar.

Fig. 10 is a side view of the sprocket with the chain of teeth engaged about the sprocket.

Figure 1:
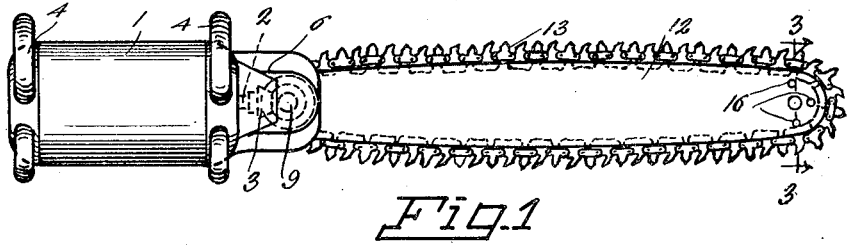
Fig. 1 is a side view of the improved saw.
Figure 2:
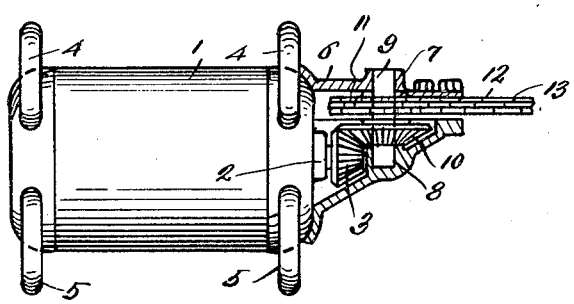
Fig. 2 is a view showing the motor in top plan and the driving connection between the motor and the saw in section.
Figure 3:
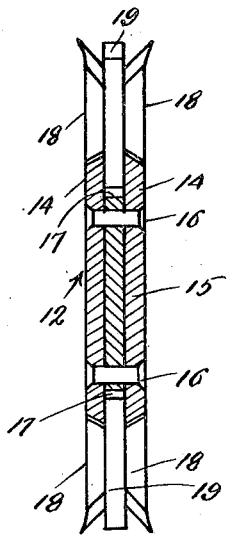
Fig. 3 is a transverse sectional view upon an enlarged scale taken along the line 3—3 of Figure 1.
Figure 4:
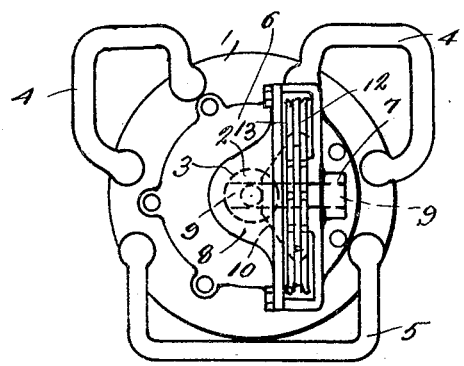
Fig. 4 is a view looking at the front end of the saw.

This improved power saw includes a motor 1 having its shaft 2 projecting from its front end and carrying a bevelled gear 3. Handles 4 project from opposite sides of front and rear end portions of the motor casing and there have also been provided supports 5 which extend transversely of the motor under front and rear ends thereof. By grasping the handles 4 two workmen may hold the saw between in position for use or one workman may grasp the front handles and by resting the rear support against him he may hold the saw in position for use. When the saw is not in use it will be set upon the ground and rest upon the two supports.

A hood or auxiliary casing 6 is mounted about the front end of the motor casing in enclosing relation to the gear 3 and the front end of the motor shaft and this hood has its forward portion formed with opposed bearings 7 and 8 in which a shaft 9 is rotatably mounted. This shaft carries a bevelled gear 10 meshing with the gear 3 so that the shaft 9 will be turned when the motor is in operation and the shaft 9 also carries a double sprocket wheel 11. A bar 12 which projects forwardly from the hood has its rear end portion mounted in the hood in front of the sprocket wheel and along this bar extends a chain 13 of saw teeth which extends along upper and lower edges of the bar and has its rear end portion trained about the sprocket wheel and its front end portion engaged about the front end of the bar. The bar 12 consists of side plates 14 and an intermediate plate 15, the plates being secured in face-to-face engagement with each other by a suitable number of rivets 16 and the intermediate plate being of less width than the side plates so that its edges are spaced from edges of the side plates and together therewith form a groove 17 along edges of the bar.

The chain of teeth consists of alternately arranged cutting teeth 18 and raker teeth 19 which are formed as shown in Figures 5, 7, and 8. Each of the raker teeth has a large base 20 of such depth that they fit within the groove and also into the circumferentially extending groove of the double sprocket. The cutting teeth are alternately disposed at opposite sides of the raker teeth and have base portions 21 of less depth than the base portions of the raker teeth so that they bear against the bevelled edges of the side plates 14 of the bar and also have engagement with edges of the double sprocket wheel between the teeth 22 of the sprocket wheel. Openings 24 and 25 are formed in end portions of the bases of the cutting teeth and the raker teeth to receive pins 26 for pivotally connecting the teeth with each other and these pins also pass through openings 27 in end portions of links 28 provided at sides of the chain opposite the base portions of the cutting teeth. It will thus be seen that each raker tooth has its end portions pivotally mounted between companion links and base portions of cutting teeth, the links and the base portions of cutting teeth at sides of the chain being so spaced from each other longitudinally of the chain that teeth of the double sprocket wheel may engage ends of the links and base portions of the cutting teeth, as shown in Figure 10, and impart movement to the chain of saw teeth along the bar 12. Hooks 29 and 30 are formed upon base portions of the cutting teeth and the raker teeth and project laterally therefrom for engagement over edges of the adjoining teeth and the links so that the teeth and the links will be braced against transverse strain and bending of the teeth and the links or breaking of the pins 26 will be prevented. Since the raker teeth have upper corners of their base portions arcuate and the cutting teeth and the links are formed with arcuate end edges the links and the teeth may have pivotal movement relative to each other and follow the curvature of the sprocket wheel and the front end of the bar. The teeth project from the bar to such an extent that when the saw is in use the cutting teeth may readily cut through a tree trunk to fell a tree or cut its trunk into logs of desired length and the raker teeth very effectively clear the cut. Since the side faces of the cutting teeth and the links are flush with side faces of the bar 12 a cut will be formed of such width that the bar may enter the cut and a thick tree be cut entirely through with the improved saw.

Having thus described the invention, what is claimed is:

In a chain saw, a guide bar consisting of side plates and an intermediate plate, said plates being secured in face-to-face engagement with each other and the intermediate plate having its edge faces spaced inwardly from edge faces of the side plates to provide a groove along marginal edges of the bar, a chain of inner and outer saw teeth slidably extending along edges of said bar with the inner teeth engaged in the groove and projecting beyond the marginal edges of the bar and the outer teeth being alternately positioned at opposite sides of the inner teeth, the inner and outer teeth being alternately arranged with one end of each outer tooth pivotally connected to one end of one of the inner teeth and the other end of said outer tooth being pivotally connected to the next following inner tooth, links alternately disposed at opposite sides of the inner teeth with each link disposed opposite one of the outer links and extending between a pair of inner links with its end portions pivotally mounted in overlapping engagement with the said pair of inner teeth, the outer teeth and the links having their inner edge faces resting against edge faces of the side plates, the said edge faces of the side plates being bevelled transversely for the full thickness of the plates and disposed at an angle in converging relation to each other towards the groove of the bar and the outer teeth and the links having their inner edge faces bevelled for their full thickness and conforming to the bevel of the edge faces of the side plates and having flat contacting engagement with the said bevelled edge faces of the side plates whereby the outer teeth and the links will tend to center the inner teeth in the groove of the guide bar and cause wear upon side walls of the groove of the guide bar to be minimized, and means for driving the chain of teeth.

STANLEY E. M. STANDAL.

REFERENCES CITED

The following references are of record in the file of this patent:

UNITED STATES PATENTS

| Number | Name | Date |
|---|---|---|
| 1,467,150 | Frere | Sept. 4, 1923 |
| 1,557,238 | Boerner | Oct. 13, 1925 |
| 1,634,643 | Bens | July 5, 1927 |
| 1,642,145 | Ferguson | Sept. 13, 1927 |
| 1,786,641 | Berg | Dec. 30, 1930 |
| 2,197,210 | Forrest | Apr. 16, 1940 |
| 2,348,612 | Deacon | May 9, 1944 |
| 2,356,437 | Smith | Aug. 22, 1944 |

FOREIGN PATENTS

| Number | Country | Date |
|---|---|---|
| 673,036 | Germany | Mar. 15, 1939 |
| 539,956 | Great Britain | Sept. 30, 1941 |